(12) United States Patent
Schreier

(10) Patent No.: US 9,033,305 B2
(45) Date of Patent: May 19, 2015

(54) WATER VALVE WITH SUPPORTED OPENING FUNCTION

(71) Applicant: Philip Schreier, Simpsonville, SC (US)

(72) Inventor: Philip Schreier, Simpsonville, SC (US)

(73) Assignee: PRETTL, Greenville, SC (US)

( * ) Notice: Subject to any disclaimer, the term of this patent is extended or adjusted under 35 U.S.C. 154(b) by 140 days.

(21) Appl. No.: 13/827,663

(22) Filed: Mar. 14, 2013

(65) Prior Publication Data

US 2014/0261743 A1    Sep. 18, 2014

(51) Int. Cl.
*F16K 31/40*  (2006.01)
*F16K 31/00*  (2006.01)
*F16K 31/126*  (2006.01)

(52) U.S. Cl.
CPC ............... *F16K 31/00* (2013.01); *F16K 31/404* (2013.01); *F16K 31/126* (2013.01)

(58) Field of Classification Search
CPC ... F16K 31/126; F16K 31/1266; F16K 31/36; F16K 31/365; F16K 31/38; F16K 31/40; F16K 31/402; F16K 31/404; F16K 31/00

USPC ........... 251/30.01, 30.02, 30.03, 30.04, 30.05
See application file for complete search history.

(56) References Cited

U.S. PATENT DOCUMENTS

| 3,593,957 | A |   | 7/1971 | Dolter |
| 3,917,218 | A |   | 11/1975 | Marocco |
| 3,994,318 | A | * | 11/1976 | Ishigaki ................... 137/630.14 |
| 5,363,873 | A |   | 11/1994 | Richmond |
| 6,293,513 | B1 |   | 9/2001 | Birkelund |
| 6,684,901 | B1 |   | 2/2004 | Cahill et al. |
| 6,824,116 | B1 | * | 11/2004 | Woo et al. ................ 251/129.04 |
| 7,703,740 | B1 |   | 4/2010 | Franklin |
| 2001/0032947 | A1 | * | 10/2001 | Freisinger et al. ......... 251/30.03 |
| 2007/0045587 | A1 |   | 3/2007 | Kolene et al. |
| 2010/0019179 | A1 |   | 1/2010 | Nguyen |
| 2011/0049403 | A1 |   | 3/2011 | Ro |

* cited by examiner

*Primary Examiner* — John K Fristoe, Jr.
*Assistant Examiner* — Andrew J Rost
(74) *Attorney, Agent, or Firm* — McNair Law Firm, P.A.; Douglas L. Lineberry

(57) ABSTRACT

Water valves and methods of regulating fluid flow for low ambient pressure water sources that reduce the amount of filtration needed for valve mechanisms operating in the water source.

15 Claims, 16 Drawing Sheets

WATER VALVE WITH SUPPORTED OPENING FUNCTION

BACKGROUND

Valves are used in many applications wherein control of flow of a fluid is required or desired. This includes controlling the flow of includes such as oil, fuel, water, gases, etc. Some valves operate to control fluid flow by positioning valving members to control the amount of fluid allowed to pass through the valve. Other valves operate in a switching fashion wherein fluid flow is either turned on or turned off. Such valves may be found in consumer and commercial appliances such as dishwashers, washing machines, refrigerators, beverage vending machines, boilers, etc., whereby water is allowed to flow for a predetermined period of time or until a predetermined volume has been dispensed therethrough. The control of the valve operation may typically be performed by an electronic control circuit, such as a microprocessor based controller, along with its associated drive circuitry, to open and/or close the valving member within the valve.

A problem with such switching valves is the force necessary to open the valving member against the static pressure of the process fluid acting on one side of the valving member. Depending on the application, this pressure may be quite high, particularly when compared with the low pressure on the opposite side of the valving member which, in many appliance applications, is at atmospheric pressure. In addition to the static fluid pressure acting on the valving member tending to keep it closed, many such switching valves also include a spring positioned to apply a force on the valving member. This spring force allows the valve to be closed upon the removal of a drive signal, and maintains a bias force on the valving member to keep it closed.

In such configurations, the valve actuator must overcome both the force generated by the static fluid pressure, which can be quite high and may vary from installation to installation, as well as the spring force, both of which are acting to keep the valve closed. Once these two forces have been overcome, however, the force necessary to continue to open the valve to its fully open position is substantially reduced as the pressure differential across the valving member face drops dramatically. Once this pressure has been equalized, the only remaining force against which the actuator must act is the spring force.

Many electronically controlled switching valves include an electrically actuated solenoid to directly act on a plunger connected to the valving member to move the valving member to its open position. Unfortunately, due to the high pressure differentials that exist for a closed valve and the spring force, the actuator needs to be relatively large so that it is able to reliably operate the valve under all operating conditions and installations. In many industries, such as the consumer appliance industry, strict governmental and certifying agency requirements place a heavy premium on an electric power usage. Further, the appliance industry is highly competitive and the cost of actuators, alone or in addition to the production costs of the valve, provides a significant detriment to developing new technologies and implementing same in the industry.

One example of a prior art instrument for controlling fluid flow is illustrated by FIG. 1. FIG. 1 shows a water supply valve that includes a valve body 10 and an electromagnet unit 20. The valve body 10 includes a water inlet 11, a water outlet 12, and a chamber 14 between the water inlet 11 and the water outlet 12. The water inlet 11 is connected with the chamber 14 via a connecting passage 11a, and a valve seat 13 is provided in the central portion of the chamber 14.

The electromagnet unit 20 drives a first valve 15 to be attached to and detached from the valve seat 13 inside the chamber 14, so that the chamber 14 and the water outlet 12 are connected to and separated from each other. The first valve 15 also partitions the inside of the chamber 14 into the upper and lower sections, such that a pressure chamber 14 is defined in the upper section.

In addition, the first valve 15 includes a diaphragm 15a and a diaphragm holder 15b. The first valve 15 also has a first water passage 17 in the peripheral portion thereof beyond the valve seat 13, and a second water passage 18 in the central portion thereof. The first water passage 17 connects the chamber 14 with a pressure chamber 16, and the second water passage 18 connects the pressure chamber 16 with the water outlet 12.

In the first and second water passages 17 and 18, the second water passage 18 is opened and closed by a second valve 23 on the lower end of a plunger 22 that is installed inside the electromagnet unit 20 under a downward elastic force from a spring 21. Here, the first water passage 17 has an inner diameter smaller than that of the second water passage 18, and controls a flow of supply water following the opening and closing of the second water passage 18.

When power is not supplied to the electromagnet unit 20, the plunger 22 is brought into close contact with the valve seat 13 under its weight and the downward elastic force of the spring 21 and, at the same time, supply water supplied from the water inlet 11 pushes the first valve 15 upward instantaneously in the initial stage. This is because the elastic force of the spring 21, which presses the plunger 22, is smaller than supply water pressure.

However, the first valve 15, which is pushed upward, is directly closed by the supply water pressure. That is, right after water pressure is applied to the underside of the first valve 15, a portion of supply water is introduced into the pressure chamber 16 through the first water passage 17 in the first valve 15. The supply water introduced in this fashion applies a certain pressing force to the upper surface of the first valve 15 to bring the first valve 15 into close contact with the valve seat 13, thereby maintaining a closed circuit state. In this fashion, it is possible to achieve the closed circuit state that stops water supply without consuming electrical power.

In addition, when power is applied to the electromagnet unit 20, the plunger 22 of the electromagnet unit 20 is pushed upward, thereby opening the second water passage 18 of the first valve 15, which was closed by the second valve 23. At this time, the water in the pressure chamber 16 is caused to flow instantaneously toward the water outlet 12 under the atmospheric pressure through the second water passage 18, thereby dropping the pressure inside the pressure chamber 16 to the same as the atmospheric pressure. The force acting on the first valve 15 is released, so that the pressure of water supplied from the water inlet 11 causes the first valve 15 to drop to the upper surface of the valve seat 10. At the same time, a supply water passage passing through the water inlet 11, the chamber 14, and the water outlet 12 of the valve body 10 is maintained in the open circuit state, thereby achieving the intended water supply state.

In order to remove impurities from supply water, which passes through the power-saving electromagnetic water supply valve as described above, a filter 24 is necessarily provided adjacent to the water inlet 11. While the filter 24 prevents the first water passage 17 and the second water passage 18 from being clogged by the cohesion of impurities, these small particles becoming trapped in filter 24 significantly reduce the flow rate compared to an amount of introduced water. In addition, impurities accumulated in the filter increase resistance and thus water is not properly supplied.

Thus, valves such as valve 15 must be carefully engineered and sized to allow proper fluid flow from the inlet into the pressure chamber 16 in order to maintain the valve in a closed condition without requiring power input. This demands careful milling and/or injection molding and construction of the valve and the water passage 17. Moreover, any pollutants in the water source entering the inlet and passing the filter may clog water passage 17. This requires one to either clean or replace the valve in order to provide for keeping the valve in the closed state as blocking water passage 17 prevents equilibrium from establishing between the inlet and pressure chamber 16, instead forcing valve 15 open and causing a leak or further damaging the valve. Moreover, low water pressure could also impact the valve as the ambient pressure may be insufficient to either flow through water passage 17 or insufficient to move valve 15 once the plunger 22 is moved.

Valve construction is further complicated because not only does the static or atmospheric pressure of water systems vary across locations, as well as within a particular location, but pollutant levels also contribute to clogging and/or blocking valving mechanisms, thereby inhibiting their function and requiring frequent service calls to either unblock or replace units that no longer function. This problem is especially prevalent in areas that couple low fluid pressures, such as municipality provided water systems, with high pollutant content of the provided fluid.

What is needed in the art are environmentally friendly, low cost methods for allowing valving mechanisms to function in low pressure situations, especially in low pressure situations where the fluid being controlled contains pollutants.

SUMMARY

Objects and advantages of the invention will be set forth in the following description, or may be obvious from the description, or may be learned through practice of the invention. It is intended that the invention include modifications and variations to the system and method embodiments described herein.

The present invention provides a unique water valve and methods for controlling fluid flow. In one embodiment a water valve is provided. The water valve includes a chamber defining an inlet and an outlet. An anchor is disposed in the chamber and engages a pull element. A sealing cylinder in the chamber engages the pull element. A membrane is also located in the chamber and includes a proximal surface facing toward the inlet and a distal surface facing away from the inlet. The membrane defines a central cavity that engages the sealing cylinder, and a continuous substantially radial surface surrounding and extending from the central cavity. In an anchor first position the pull element closes a small valve seat defined in the sealing cylinder and water flows through a bypass channel to engage the distal surface of the membrane. In an anchor second position, displacement of the anchor moves the pull element to open the small valve seat and water flows through the small valve seat through an interior of the sealing cylinder and out via the outlet; and in an anchor third position, the sealing cylinder is displaced by the pull element and opens a main valve seat such that water flows substantially from the inlet through the outlet.

Also, in the anchor third position, water flows substantially from the inlet through the outlet wherein in the anchor third position, water flows substantially from the inlet through the outlet while flow reduces, or altogether ceases, through the small valve seat and may flow from the inlet through the outlet without passing through a filter. Additionally, the sealing cylinder may be at least partially encircled by a filter. Still further, only water passing through the filter at least partially encircling the sealing cylinder contacts the distal surface of the membrane. Indeed, only water passing through the filter at least partially encircling the sealing cylinder may flow through the small valve seat and out the outlet. The membrane, meanwhile, may be flexible. Also, the diameter of the bypass may be smaller than the diameter of the small valve seat. Further still, the membrane may only define one opening extending through the membrane, such as the central cavity.

In another embodiment, a method of regulating fluid flow is disclosed. A housing is formed comprising an inlet and an outlet for a fluid stream. A membrane may be placed in the housing with a proximal face directed toward the inlet and a distal face directed away from the inlet. A control flow pathway may be formed in the housing that exerts pressure on the distal surface of the membrane while preventing fluid from exiting via the outlet. A movable member may be positioned in the housing that influences the control pathway, wherein repositioning the movable member may open a first valve seat and may allow the fluid stream to exit the control flow pathway. The movable member may be further positioned to open a second valve seat, wherein opening the second valve seat may allow fluid to flow from the inlet to the outlet and bypass the control pathway. Further, when the second valve seat is open, fluid may flow from the inlet through the outlet without passing through a filter. Also, a sealing cylinder may be positioned in the housing that is at least partially surrounded by a filter. Still further, only water passing through the filter at least partially surrounding the sealing cylinder may contact the distal surface of the membrane. Even further, only water passing through the filter at least partially encircling the sealing cylinder may flow through the first valve seat valve seat and out the outlet. Also, the membrane may be flexible. The diameter of the control pathway at its entrance may be smaller than a diameter of the first valve seat. Also, only a single passage may extend through the membrane.

Additional aspects of particular embodiments of the invention will be discussed below with reference to the appended figures.

BRIEF DESCRIPTION OF THE DRAWINGS

A full and enabling disclosure, including the best mode thereof, to one of ordinary skill in the art, is set forth more particularly in the remainder of the specification, including reference to the accompanying Figures, in which.

DETAILED DESCRIPTION

Reference will now be made in detail to various embodiments of the presently disclosed subject matter, one or more examples of which are set forth below. Each embodiment is provided by way of explanation, not limitation, of the subject matter. In fact, it will be apparent to those skilled in the art that various modifications and variations may be made to the present disclosure without departing from the scope or spirit of the disclosure. For instance, features illustrated or described as part of one embodiment, may be used in another embodiment to yield a still further embodiment. Thus, it is intended that the present disclosure cover such modifications and variations as come within the scope of the appended claims and their equivalents.

Figure 1:
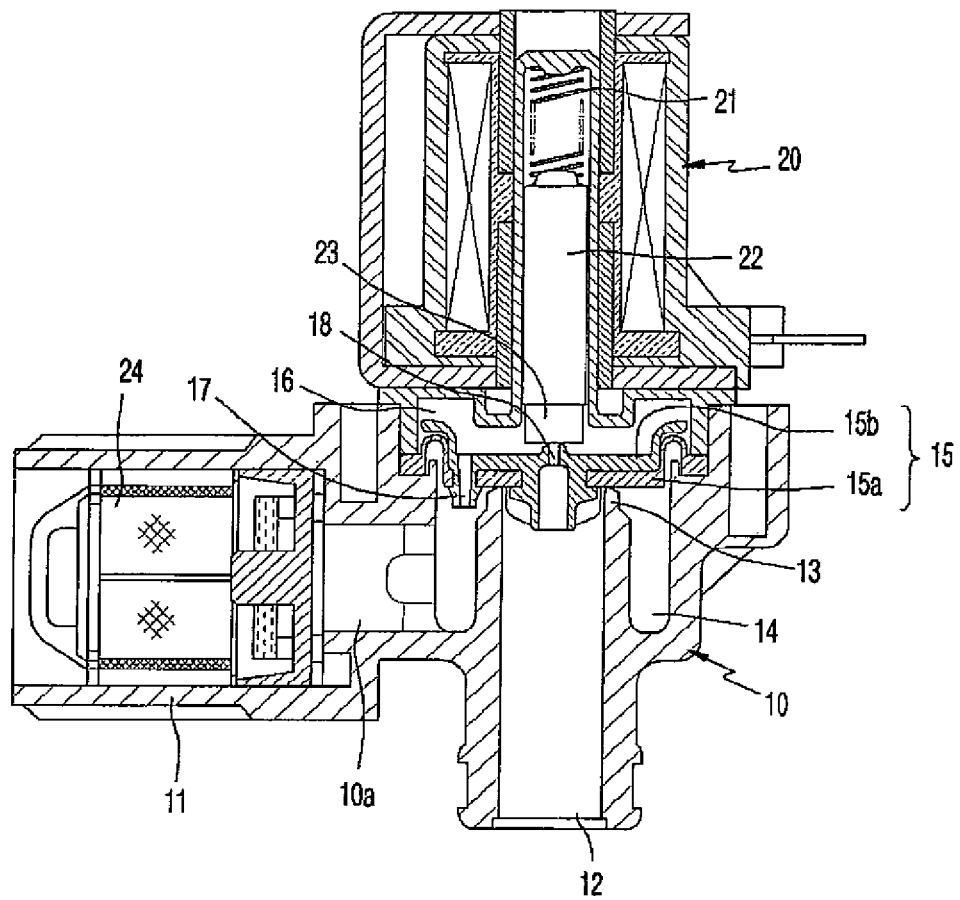
FIG. 1 is an illustration of a prior art valve system.
Figure 2:
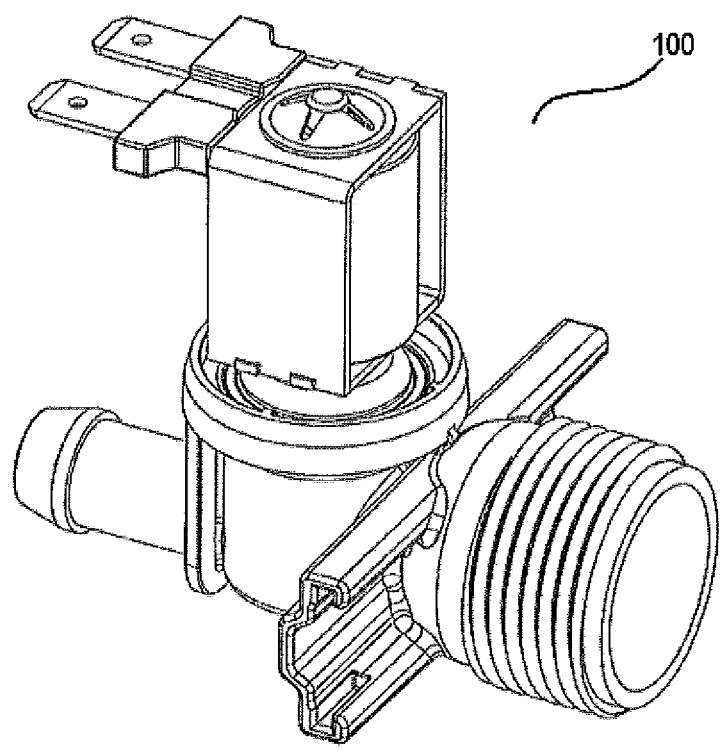
FIG. 2 is an angled, plan view of one embodiment of a water valve disclosed herein.
Figure 3:
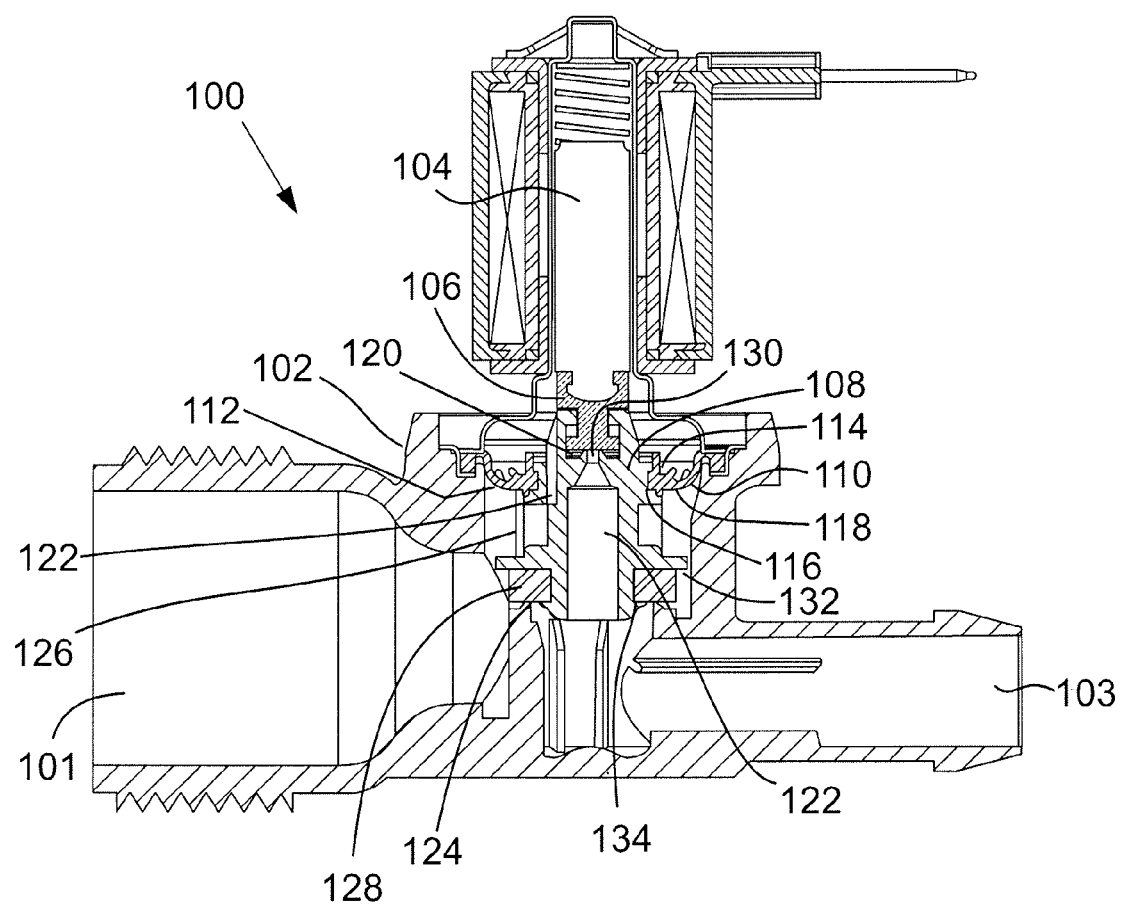
FIG. 3 is a cross-sectional view of the water valve of FIG. 2.

In general, the present disclosure is directed to an improved water valve and methods for regulating fluid flow. Copending application Ser. No. 13/804,835, filed contemporaneously herewith, is also directed to valves and fluid regulation and is hereby incorporated in its entirety by reference. FIG. 2 illustrates a plan view of one possible embodiment of water valve 100 of this disclosure. FIG. 3 shows a cross sectional view of water valve 100. As FIG. 3 illustrates, a chamber 102 includes an inlet 101 and an outlet 103. Anchor 104 is disposed in chamber 102 and engages a pull element 106. A sealing cylinder 108 in chamber 102 engages pull element 106. Membrane 110 is also located in chamber 102 and includes proximal surface 112 facing toward inlet 101 and distal surface 114 facing away from inlet 101. Membrane 110 may define a central cavity 116. In some embodiments, membrane 110 may only define a single opening or passage extending from the proximal to distal face through membrane 110, such as central cavity 116. In other embodiments, membrane 110 may contain additional openings aside from central cavity 116. However, in a preferred embodiment, membrane 110 only defines a single passage, central cavity 116, extending through membrane 110. Membrane 110 may define a continuous, unbroken substantially radial surface 118 surrounding and extending from central cavity 116.

Membrane 110 may also engage sealing cylinder 108. Engagement between membrane 110 and sealing cylinder 108 may be accomplished by frictional engagement between membrane 110 and sealing cylinder 108. Alternatively, sealing cylinder 108 may include a contoured or shaped geometry to engage, hold or otherwise interface with central cavity 116. Further, various mating configurations such as a male/female arrangement, tooth and slot, dovetail, etc., may be used for engaging membrane 110 and sealing cylinder 108. In a preferred embodiment, the inner diameter of membrane 110 may be sized smaller than the outer diameter of sealing cylinder 108 in order to ensure tight engagement between the two.

Sealing cylinder 108 may engage the main valve seat at a distal portion of sealing cylinder 122 located toward inlet 101 and outlet 103. This engagement may be enhanced by incorporating flat seal 128, which can be made from synthetics, rubbers or plastics. Flat seal 128, as well as any ring seal, ring seal rods, or membranes discussed herein, may be formed from rubber such as HNBR, NBR, or EPDM. Flat seal 128 may also be formed from neoprene, silicone and soft plastics. Flat seal 128 may partially or completely surround sealing cylinder 108 and engage main valve seat 124. Flat seal 128 may be circular or otherwise shaped as known to those of skill in the art. Flat seal 128 may engage sealing cylinder 122 by frictional engagement, mating geometries, adhesives, welding, etc., as known to those of skill in the art. In one preferred embodiment, flat seal 128 is held in place by surrounding sealing cylinder 108 and being held in place between flat seal upper engagement surface 132 and flat seal lower engagement surface 134 of sealing cylinder 122. Sealing cylinder 122 may also form the small valve seat 120 as well as define small valve seat opening 130 by defining an opening in the proximal portion of sealing cylinder 108 through which fluid may flow once pull element 106 loses contact with sealing cylinder 108. Sealing cylinder 108 may also define an interior passage 122 through which fluid entering small valve seat opening 130 may flow and eventually escape via outlet 103.

Figure 4:
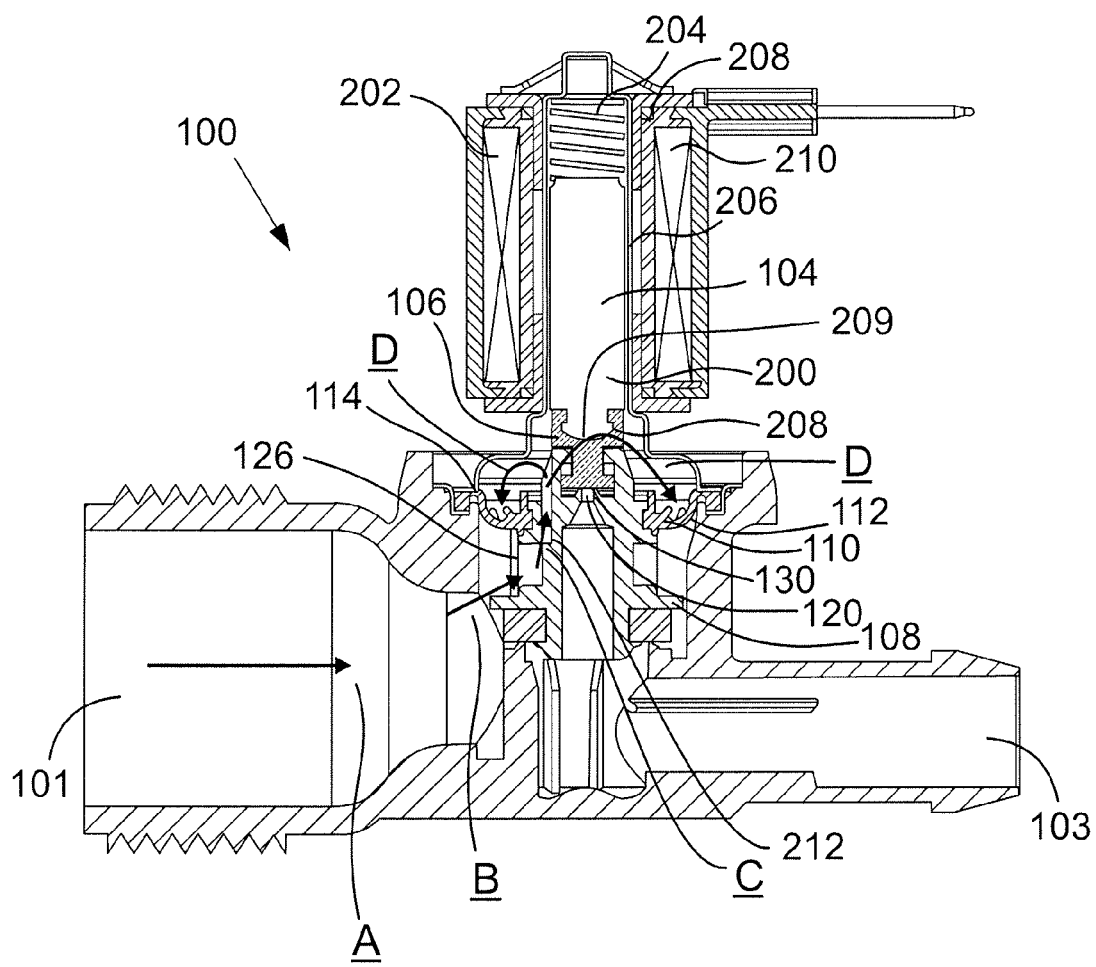
FIG. 4 illustrates one embodiment of a water valve of the present disclosure with an anchor in a possible first position.

FIG. 4 illustrates water valve 100 with anchor 104 in a first position 200. Movement of anchor 104 may be effectuated by means known to those of skill in the art such as hydraulic activation, pneumatic, piezoelectric, electromagnetic, etc. Reversal of the movement may be accomplished by deactivating the motivating means. In a preferred embodiment, electromagnet 202 and spring 204 work together to position anchor 104 within sleeve 206 contained within chamber 102. Anchor 104 is preferably corrosion resistant and formed from magnetic steel. It slides within sleeve 206 and may have specific geometries 208 on proximal surface 209, closest to inlet 101, that engages with pull element 106, for instance, a round mating geometry may be formed on proximal surface 209, or other shapes as known to those of skill in the art, that enable anchor 104 to engage and pull or push pull element 106 into and out of engagement with sealing cylinder 108. Spring 204 may be placed circumferentially around anchor 104. A bobbin 208 may surround and enclose spring 204 and anchor 104. A coil 210 may circumferentially, or otherwise as known to those of skill in the art, engage bobbin 208 surrounding at least a portion of bobbin 208.

In anchor first position 200, electromagnet 202 is not activated. Pull element 106 sits atop sealing cylinder 108 and closes small valve seat 120 and small valve seat opening 130. Water or fluid flowing into inlet 101, shown by arrow A, flows through filter 126, shown by arrow B, through fluid passage 212, shown by arrow C, and engages distal surface 114 of membrane 110, shown by arrows D. In anchor position 200, the force generated by pressure on membrane distal surface 114 is greater than the force generated by pressure on membrane proximal surface 112. Small valve seat 120 and small valve seat opening 130 are both closed by pull element 106, thereby preferably preventing any fluid flow through the interior 122 of sealing cylinder 108 and out via outlet 103.

Figure 5:
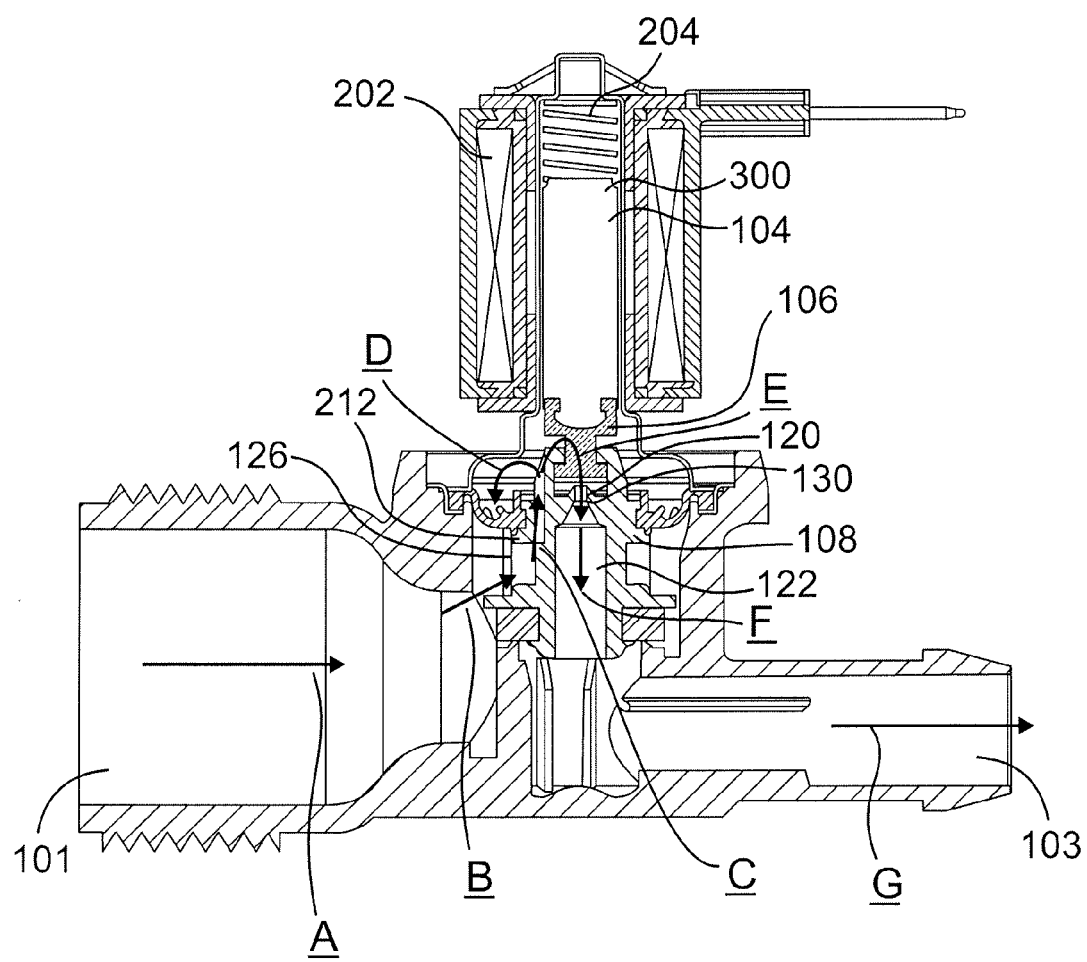
FIG. 5 illustrates one embodiment of a water valve of the present disclosure with an anchor in a possible second position.

FIG. 5 illustrates anchor 104 in an anchor second position 300. Activation of electromagnet 202, or other motivating means as known to those of skill in the art, moves anchor 104, compresses spring 204, and thereby moves pull element 106, which is engaged to anchor 104, away from sealing cylinder 108. Movement of pull element 106 thus opens small valve seat 120 and small valve seat opening 130. Based on this movement, water or fluid flowing into inlet 101, shown by arrow A, flows through filter 126, shown by arrow B, through fluid passage 212, shown by arrow C, and engages distal surface 114 of membrane 110, shown by arrow D. Now, with small valve seat 120 and small valve seat opening 130 both open, water can flow through small valve seat 120 and small valve seat opening 130, shown by arrow E. Water or fluid may then pass through the interior 122 of sealing cylinder 108, shown by arrow F, and exit valve 100 via outlet 103, as shown by arrow G. In this configuration, pressure is still exerted on distal membrane surface 114, but this pressure is now lessened due to water or fluid flowing through small valve seat 120 and small valve seat opening 130 and out of valve 100 via outlet 103.

Figure 6:
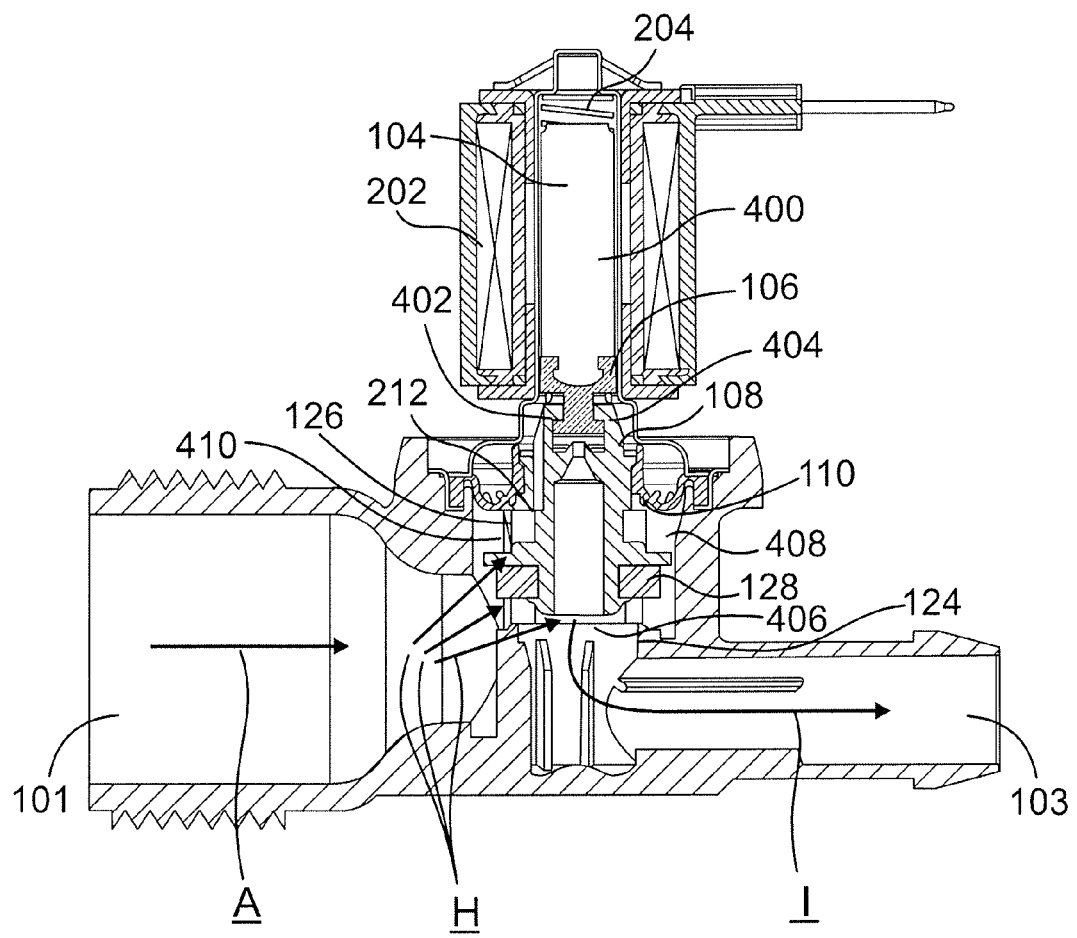
FIG. 6 illustrates one embodiment of a water valve of the present disclosure with an anchor in a possible third position.

FIG. 6 illustrates anchor 104 in an anchor third position 400. In anchor third position 400, electromagnet 202, or other motivating means as known to those of skill in the art, further moves anchor 104 distally, away from inlet 101, further compresses spring 204, and thereby further moves pull element 106. As shown in FIG. 6, engagement portion 402 of pull element 106 contacts engagement surface 404 of sealing chamber 108. This allows pull element 106 to move or displace sealing chamber 108 distally, away from inlet 101, in order remove sealing chamber 108 from engagement or contact with main valve seat 124 in order to open main valve seat 124. Engagement between sealing chamber 108 and main valve seat 124 may occur directly, whereby a surface of sealing chamber 108 contacts and occludes or blocks main valve seat 124. Alternatively, engagement between sealing chamber 108 and main valve seat 124 may occur via flat seal 128. Flat seal 128 may partially or completely encircle or surround sealing cylinder 108 and may engage main valve seat 124 in order to block or occlude main valve seat 124. As FIG. 6 illustrates, movement of sealing cylinder 108 distally, away from inlet 101, removes flat seal 128 from blocking or occluding main valve seat 124, thereby opening the main valve seat 124.

As FIG. 6 shows, anchor position 400 allows water or fluid to flow into valve 100 via inlet 101, shown by arrow A. However, because main valve seat 124 and main valve seat opening 406 are open, water now flows and engages filter 126, the lower portion of sealing cylinder 108, as well as flat seal 128, as well as flows toward main valve seat 124, as shown by arrows H. Further, water may then flow out main valve seat opening 406 and exit via the valve 100 outlet 103, illustrated by arrow I.

In anchor position 400, water or fluid flow through passage 212 of sealing cylinder 108 is substantially reduced and may altogether cease. While some very minimal flow may still be possible, this is unlikely given that the diameter of the flow path created by opening main valve seat 124 and exposing main valve seat opening 406 is much greater than the diameter of the control path formed by fluid passage 212 and small valve set 120 and small valve seat opening 130. This is also the case for water or fluid flow through small valve seat 120 and small valve seat opening 130 based on the water through inlet 101 now seeking the path of least resistance, escaping through main valve seat 124 and main valve seat opening 406 and exiting via outlet 103.

In the configuration illustrated by FIG. 6, pressure on membrane distal surface 114 is significantly less than the pressure on membrane proximal surface 112, facing toward inlet 101. Moreover, membrane 110, as shown by FIG. 6, due to the effects of the motivating means, such as, for example, electromagnet 202, and of the changed pressure differential between the membrane's proximal 112 and distal 114 surfaces has now "flexed" distally, away from inlet 101, in order to further assist with moving sealing cylinder 108 distally and opening main valve seat 124 and main valve seat opening 406. This further promotes fluid exiting via outlet 103 as the movement of membrane 110 further opens the cavity 408 containing main valve seat 124 and thereby allowing a larger volume to flow through and exit via main valve seat opening 406.

As FIG. 6 shows, in the anchor third position 400, water or fluid flows substantially from the inlet 101 and exits via outlet 103 without flowing through passage 212 and the fluid flow through filter 126 is substantially, or altogether, reduced, as is any flow through small valve seat 120 or small valve seat opening 130. Indeed, this flow arrangement may clean filter 126 as water or fluid will engage the outward facing portion 410 of filter 126 and remove any detritus or debris, not shown, affixed thereto. Thus, water passes substantially or predominately from the inlet to the outlet without being filtered and may even clean filter 126 used for water flowing through passage 212 to engage membrane distal surface 114.

While anchor 104 is described by the term "position" with respect to FIGS. 4-6, those of skill in the art will recognize that a multitude, or range, of positions are possible as described herein based on the disclosure pertaining to a respective FIGURE of a particular anchor "position." The disclosure should not be considered or limited to anchor 104 as disposed statically or rigidly or in a particular fixed position via the positions illustrated in FIGS. 4-6. Variations and various placements of anchor 104 may accomplish the results described in each of FIGS. 4-6 and multiple such positions are not only possible but are herein fully supported and disclosed as would be recognized by those of skill in the art.

Figure 7:
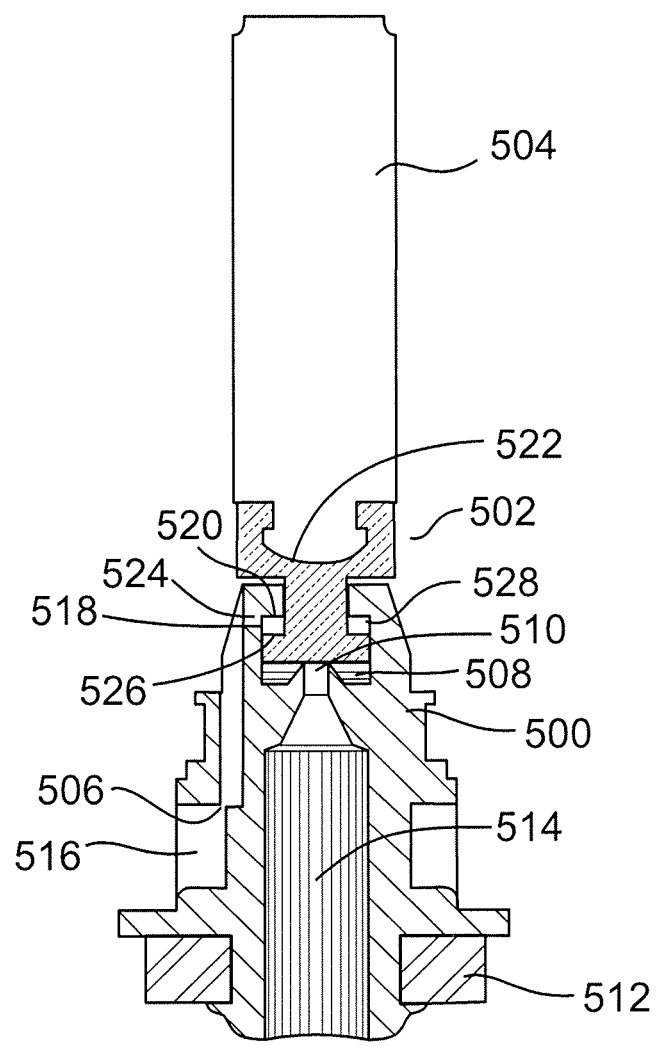
FIG. 7 illustrates one possible embodiment of sealing cylinder engaged with a pull element and anchor.

FIG. 7 illustrates one possible embodiment of a sealing cylinder 500 engaged with a pull element 502. FIG. 7 shows sealing cylinder 500 engaged with pull element 502, which is also engaged with anchor 504. As explained herein, when the anchor is displaced distally, away from the inlet, this effects movement in pull element 502 due to the mating geometry coupling anchor 504 with pull element 502. Pull element 502 and anchor 504 may have various capture or mating geometries 522. This may include specific shapes for engaging with one another. Anchor 504 and/or pull element 502 may be shaped or formed and may be ridged, curved, include flanges, grooves, struts, supports, or otherwise be formed to securely engage and/or hold to one another and not separate, especially during movement of anchor 504 under influence of motivating means such as electromagnet 202. The mating geometries may include a male/female arrangement of corresponding structures as known to those of skill in the art. Anchor 504 may additionally be shaped, as known to those of skill in the art, to allow water to pass over or around its surface in order to not impede flow during operation. Pull element 502 may be formed from rubbers as described herein. In a preferred embodiment, pull element 502 is formed from rubber soft enough to seal small valve seat 120 but hard enough to maintain its shape when effecting movement of sealing cylinder 108.

Sealing cylinder 500 may define an engagement chamber 524 for receiving pull element 502. Engagement chamber 524 allows for pull element 502 to initially separate from small valve seat 508 to open small valve seat opening 510, without effecting movement of sealing cylinder 500. This may be accomplished, as illustrated in one embodiment shown in FIG. 7, by having engagement chamber 524 shaped to allow pull element 502 to slidably move, both distally, away from the inlet, not shown, and proximally, toward the inlet, not shown, with respect to small valve seat 508. Thus, pull element 502 is capable of opening small valve seat 508 and small valve seat opening 510 without requiring movement of sealing cylinder 500. Thereby providing access to sealing cylinder interior 514.

Further, in order to displace sealing cylinder 500 and/or flat seal 512 from a main valve seat, not shown, pull element 502 may be essentially 'T' shaped with respect to the portion of pull element 502 enclosed or captured by engagement chamber 524 of sealing cylinder 500. While shown as 'T' shaped, one skilled in the art would recognize that other shapes and configurations are also possible. A pull element engagement surface 518, may be formed on a distal surface 526, facing away from the inlet, and may engage with a sealing cylinder engagement surface 520 formed on a proximal surface 528, facing toward the inlet, that may be formed in an upper portion of engagement chamber 524. By engagement of the respective engagement surfaces 518 and 520, anchor 504, via pull element 502, may effectuate movement of sealing cylinder 500 away from a main valve seat, not shown.

Filter 516 may partially or full encircle sealing cylinder 500. In a preferred embodiment, filter 516 encircles a portion of sealing cylinder 500 and covers sealing cylinder fluid passage 506 in order to filter fluid passing through fluid passage 506. Filter 516 may be welded, affixed with adhesives, "snap fit" or otherwise engaged with sealing cylinder 500 as known to those of skill in the art. Filter 516 may be formed from wire, plastic mesh, perforated metal, or shaped plastic cylinders. In a preferred embodiment, filter 516 may be press-fitted onto sealing cylinder 500.

Figure 8:
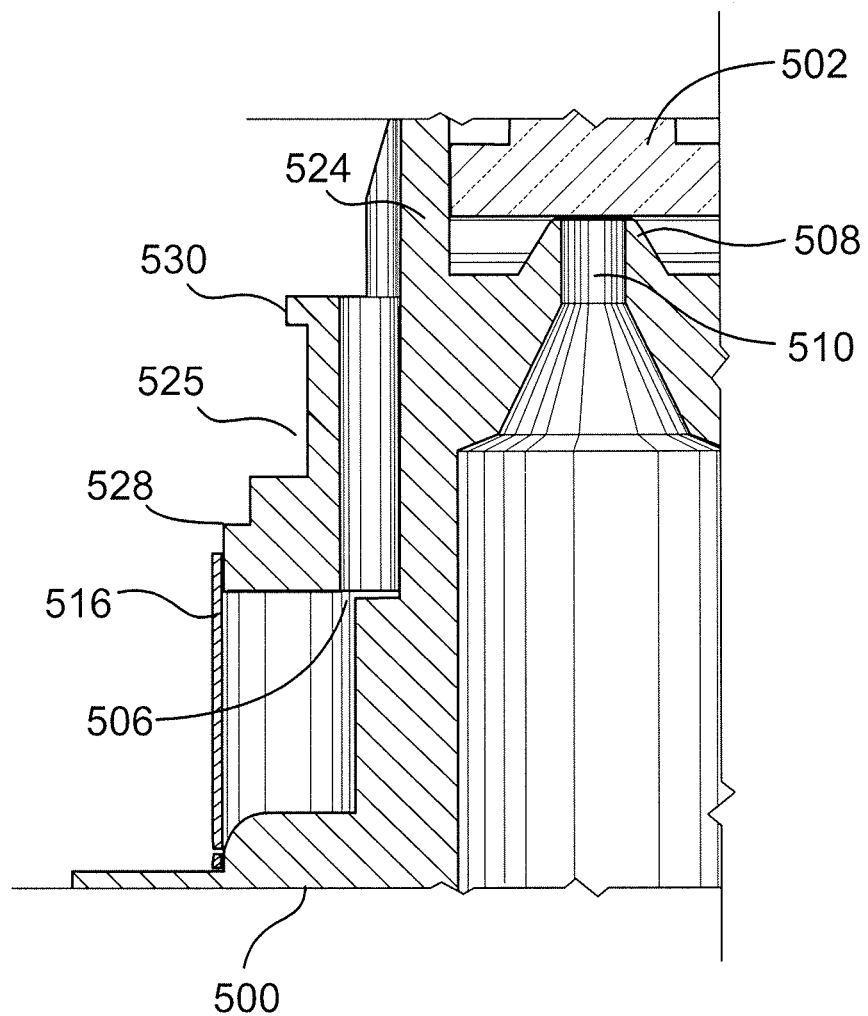
FIG. 8 illustrates an enlarged, cut-away view of a sealing cylinder fluid passage.

FIG. 8 illustrates an enlarged, cut-away view of a fluid passage in a sealing cylinder 500. Fluid passage 506 may defined in sealing cylinder 500 either by boring, molding, heat forming, etc., as known to those of skill in the art. In a preferred embodiment, allowed a slight overlap during molding may be used to form passage 506. As FIG. 8 illustrates, filter 516 covers fluid passage 506 such that only water or fluid entering passage 506 is filtered prior to exiting passage 506. This arrangement may help prolong valve life as only a small or "control" portion of the water—control in the sense that the water or fluid entering passage 506 helps "control" closure of the valve due to exerting pressure on the distal surface 114, facing away from the inlet, side of membrane 110—entering the valve, as opposed to all water entering the inlet as discloses in various prior art mechanisms, needs to be filtered in order to maintain the integrity of the valve and prevent occlusion of the small valve seat 508, small valve seat opening 510 and/or to prevent debris from interfering with the seal between pull element 502 and valve seat 508 or opening 510. This also protects the membrane, not shown, from abrasion or other physical damage caused by debris or detritus in the water supply as filter 516 removes and screens same prior to water or fluid encountering the membrane. Further, in a preferred embodiment, the diameter of fluid passage 506 is less than or smaller than the diameter of small valve seat opening 510. Even further, all openings in the flow line subsequent to water or fluid flowing through fluid passage 506 may be larger in diameter than the diameter of small valve seat opening 510.

FIG. 8 also illustrates membrane engagement surface 525 formed into the exterior of sealing cylinder 500. Membrane 110, not shown, may engage to sealing cylinder 500 via frictional engagement, mating geometries as described herein or known to those of skill in the art, adhesives, or other means as known to those of skill in the art. As FIG. 8 discloses, lower lip 528 and upper lip 530 may serve to hold membrane 110 in engagement with the exterior of sealing cylinder 500.

Figure 9:
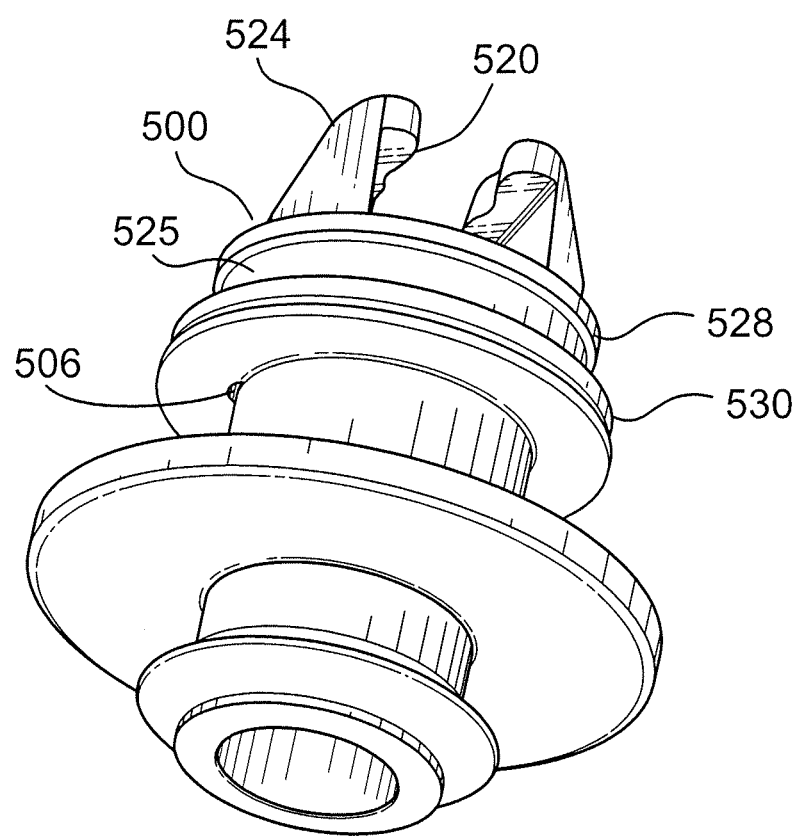
FIG. 9 shows a plan view of one embodiment of a sealing cylinder of the current disclosure.
Figure 10:
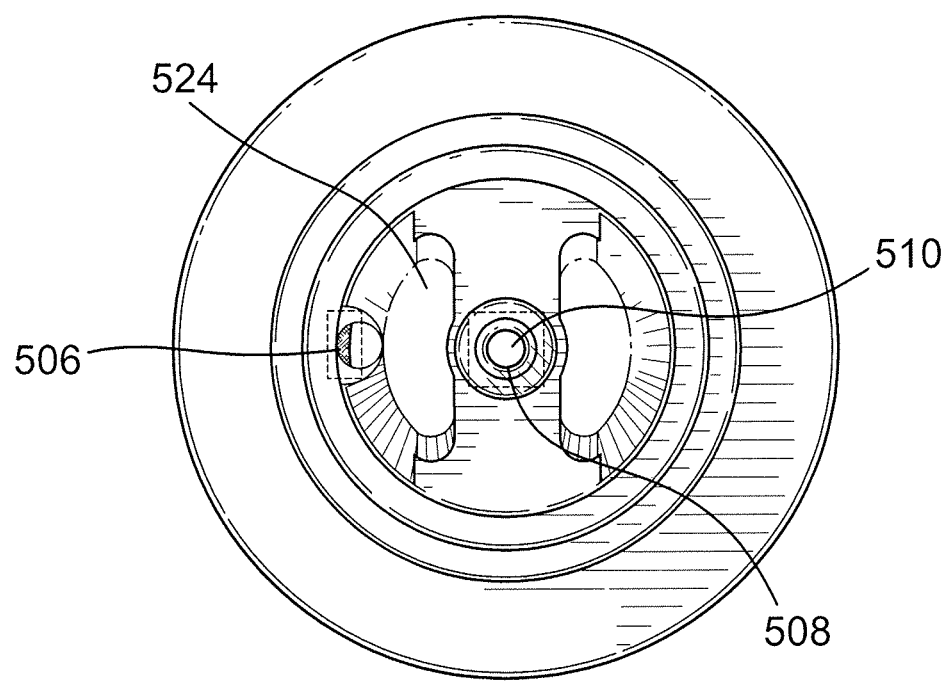
FIG. 10 shows a top down view of the sealing cylinder of FIG. 9.

FIG. 9 shows a plan view of one embodiment of a sealing cylinder of the present disclosure. FIG. 10 is a top down view of the sealing cylinder of FIG. 9. Sealing cylinder 500 may be shaped to not impede water flow from water entering the control chamber, or membrane influencing, portion of the water valve via fluid passage 506. This includes forming sealing cylinder 506 with open structures, such as engagement chamber 524, so that water exiting fluid passage 506 may engage the distal surface of the membrane, not shown without being impeded by sealing cylinder 500. Fluid passage 506, as shown in FIG. 10, may be created by allowing a small overlap when an injection molding arrangement is used to form sealing cylinder 500.

Figure 11:
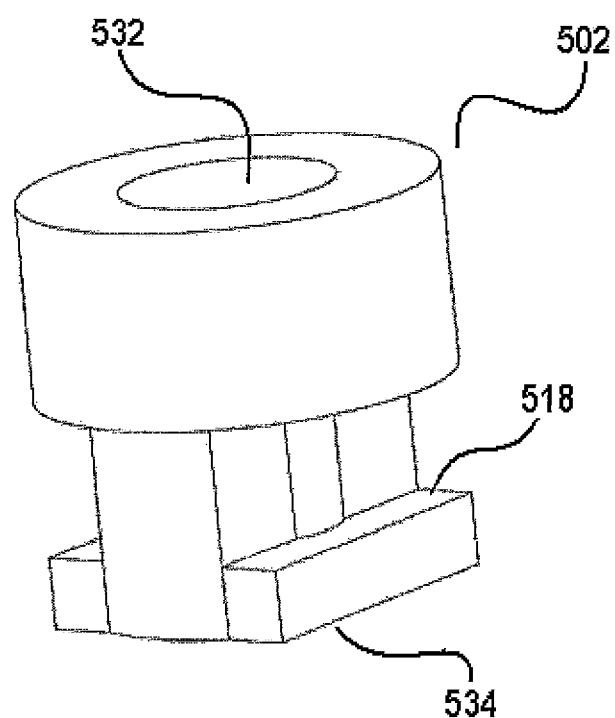
FIG. 11 shows a plan view of one embodiment of a pull element of the present disclosure.
Figure 12:
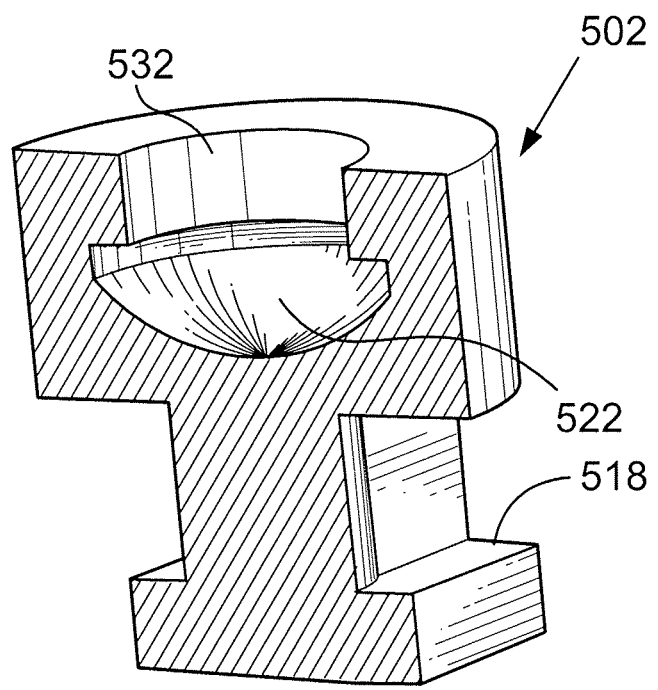
FIG. 12 shows a cross-sectional view of the pull element of FIG. 11.

FIG. 11 shows a plan view of one embodiment of a pull element of the present disclosure. Pull element 502 may be solid or hollow. In a preferred embodiment, pull element 502 is hollow and defines a cavity 532 for containing mating geometry 522, not shown, for affixing pull element 502 to anchor 504, not shown. FIG. 12 shows a cross-sectional view of the pull element of FIG. 11. Pull element 502 includes cavity 532 that houses mating geometry 522 to allow for secure engagement between anchor 504, not shown, and pull element 502. Mating geometry 522 may be shaped to have a specific engagement contour, shape, or geometry with anchor 504, such as male/female engagement, tongue in groove, twist engagement, or other specific geometries as known to those of skill in the art. Pull element 502 may also include engagement surface 520 for contacting and pulling sealing cylinder 500, not shown.

Pull element 502 may be formed from various materials. In a preferred embodiment, pull element 502 is formed from rubber as well, including HNBR, NBR, or EPDM. EPDM (ethylene propylene diene monomer rubber) is preferred because of its resistance to chlorine that may be present in water supplies.

Figure 13:
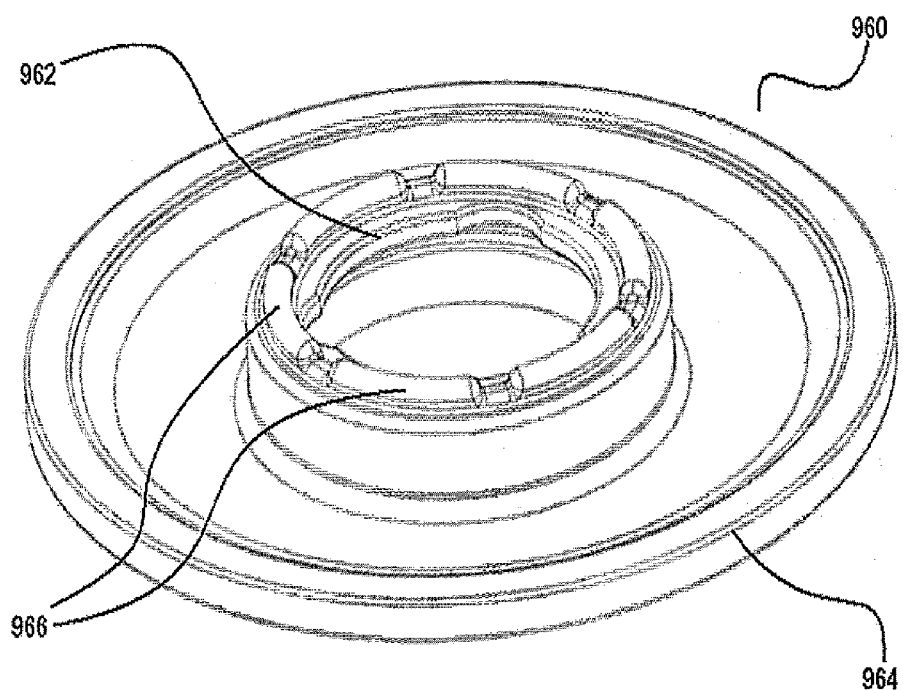
FIG. 13 illustrates one embodiment of a membrane of the present disclosure.
Figure 14:
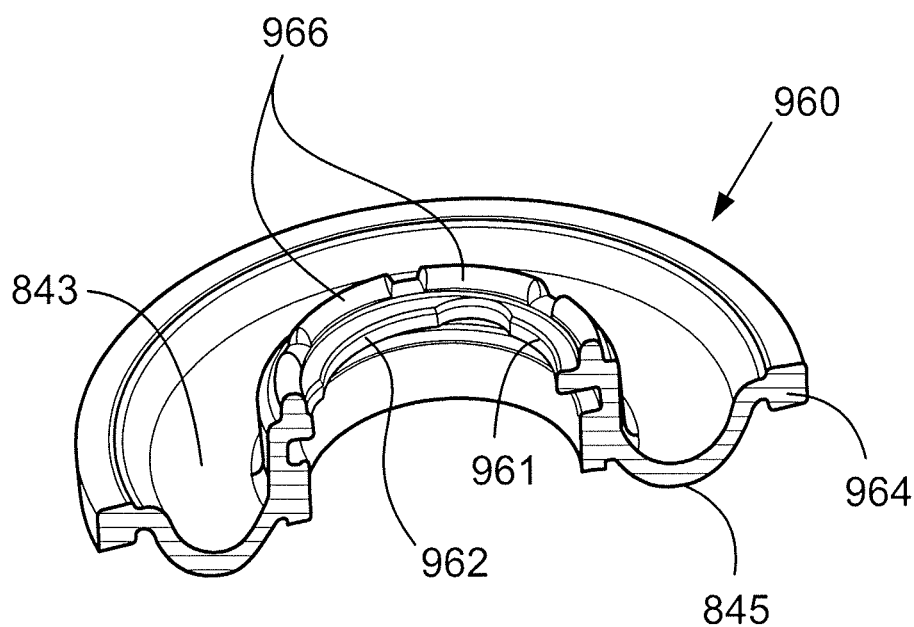
FIG. 14 illustrates a cross-sectional view of FIG. 13.

FIG. 13 illustrates one embodiment for a membrane 960 that may be employed in a valve as disclosed herein. FIG. 14 illustrates a cross-sectional view of FIG. 13. While FIGS. 13 and 14 illustrate membrane 960 as having a generally circular appearance, the membrane may be shaped in any manner known to those of skill in the art in order to fit and function within water valve 100, this includes but is not limited to oblong, ellipses, squares, rectangles, triangles, polygons, etc. The membrane may be constructed from suitable flexible materials, including but not limited to rubbers, silicones, neoprenes, etc.

Membrane 960 preferably is flexible to accommodate position shifts, as well as flexing under influence by anchor 504 and/or water pressure on the membrane's proximal surface, facing toward the inlet, during use in water valve 100. As FIG. 13 illustrates, membrane 960 may have specifically shaped sealing geometries for engaging sealing cylinder 500, membrane sealing chamber geometry 962, as well as geometries for engaging sleeve 206 such as membrane sleeve geometry 964. These sealing geometries render membrane 960 impervious to water flowing through the membrane as well as ensure a water-tight engagement between membrane 960 and sleeve 206 as well as sealing cylinder 500. Membrane 960 is free from openings that would allow water to pass through the membrane 960, central cavity 116, as discussed above, engages and seals against sealing cylinder 500. Membrane 960 may also have sleeve engagement features 966 for engaging sleeve 206. While FIG. 13 illustrates six sleeve engagement features 966, the disclosure is not so limited and more or less sleeve engagement features 966 may be present ranging from one continuous engagement feature to separated features having one, two, three, four, five, six, or more separate sleeve engagement features 966.

Membrane 960 should also be able to withstand pressure. For instance, in a preferred embodiment membrane 960 should be able to withstand a pressure of 24 bar, but lower and higher pressures are also included in this disclosure. For instance, membrane 960 should be able to withstand pressures ranging between 0-24 bar, including ranges therein such as 0-5 bar, 5-10 bar, 15-20 bar, and 20-24 bar, including individual pressures contained therein. Membrane 960 may also be formed with engagements such as 966 to lock the membrane into engagement with connecting members. Membrane 960 may also include a pressure ring 961 for engaging with sealing cylinder 500 via exerting pressure for frictional or other contact with membrane engagement surface 526. FIG. 14 is a cross sectional view of FIG. 13 and shows proximal surface 845 (inlet facing) and distal surface 843 (facing away from the inlet). Membrane 960 serves to seal the portions of water valve 100 containing the distal membrane surface 843 and proximal membrane surface 845 from one another as well as to prevent leakage around sealing chamber 500.

Figure 15:
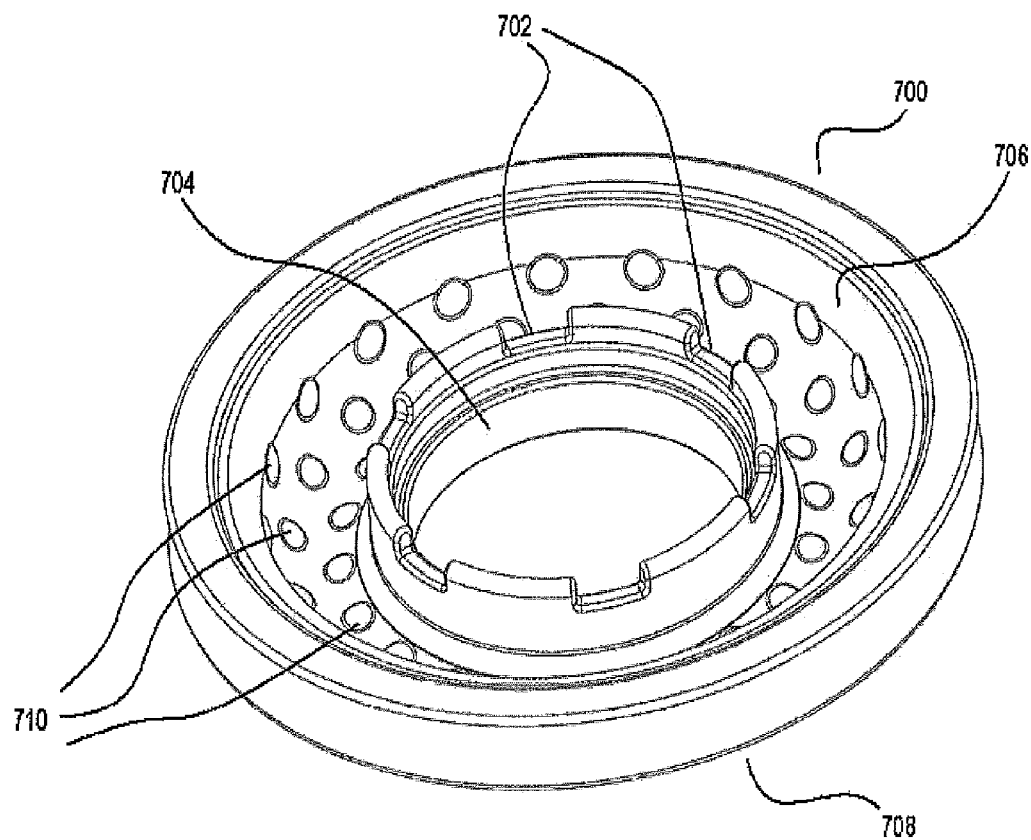
FIG. 15 illustrates another embodiment of a membrane of the present disclosure.
Figure 16:
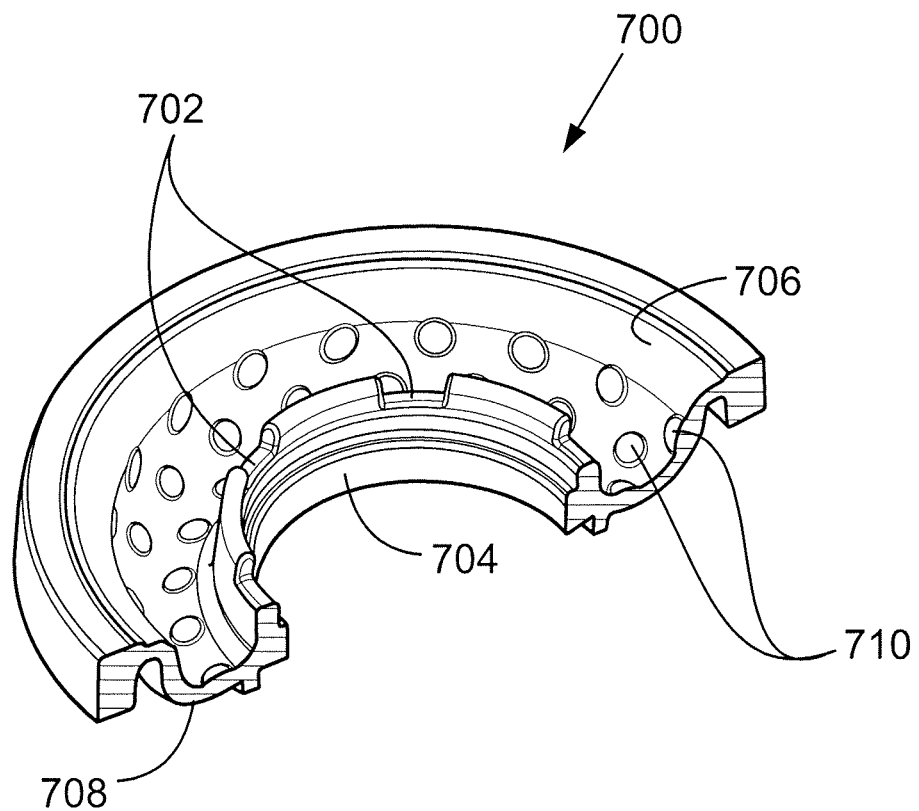
FIG. 16 illustrates a cross-sectional view of the membrane of FIG. 15.

FIG. 15 illustrates an alternative embodiment of membrane 700 that may be employed in the present disclosure. Membrane 700 includes engagement members 702 for locking membrane 700 in place with opposing connecting members, not shown. Membrane 700 also includes pressure ring 704 for engaging with sealing cylinder 500 via pressure or frictional engagement at membrane engagement surface 526. Membrane 700 has a distal surface 706 facing away from inlet 101 and a proximal surface 708 facing toward inlet 101. Membrane 700 also includes raised protrusions 710 that help prevent sticking between membrane 700 and any features in water valve 100 that may come into contact with membrane 700 in either its "relaxed" position in the anchor first position or its "flexed" configuration in the anchor third position or for positions between these two. FIG. 16 illustrates a cross-sectional view of the membrane of FIG. 15.

The current disclosure presents several advances over the prior art including a membrane free of holes, other than the central cavity 116, that may become clogged by detritus or require completely filtered water. Also, a smaller portion of water entering the valve is filtered, just the portion of water eventually contacting membrane distal surface 114 and/or passing through small valve seat 120, as opposing to valve mechanisms that filter the entire volume of water entering the valve, thus leading to increased clogs that damage the valve and require periodic maintenance or upkeep, or valve replacement. Further, opening of main valve seat 124 is accomplished by dual action of the pressure differential between the membrane proximal and distal surfaces and movement of the anchor. This arrangement also helps maintain the valve in a closed position when the anchor is not activated as pressure on the membrane distal surface 114 keeps sealing cylinder 108 in place on main valve seat 124. Further, filter 126 not only filters only a small portion of water entering valve 100 but it can be cleansed by water or fluid flowing over filter outer facing 410 and sweeping the debris along with the fluid flow out outlet 103. Also, by increasing the diameter of the control water pathway from its initiating point at fluid passage 212 through small valve seat opening 130 and main valve seat opening 406, this encourages fluid flow from the control portion of the mechanism (the area containing the membrane distal surface 114) as the anchor and membrane open small valve seat 120 and eventually main valve seat 124. The small diameter of fluid passage 212 also discourages water from entering the control portion when main valve seat 124 is open, thus relieving pressure on the distal membrane surface 114 and reducing the amount of energy required to keep main valve seat 124 open.

When small valve seat 120, and therefore small valve seat opening 130, are closed, pressure from inlet 101 through passage 212 and surrounding sealing cylinder 108 and both sides of membrane 110 are equal. Pressure in sealing cylinder interior 122 through main valve seat 124 and outlet 103 is at ambient pressure. When anchor 104 moves to the anchor first position 200, pressure in the valve changes. Pressure on membrane distal surface 114 is now less than pressure on membrane proximal surface 112 but the pressure on membrane distal surface 114 remains higher than the ambient pressure existing in sealing cylinder interior 122, main valve seat 124 and outlet 103. Here, fluid exits via small valve seat 120 but flow through passage 212 to enter the control portion of the valve (the portion of the valve allowing for pressure to be exerted on membrane distal surface 114) is significantly reduced or ceases altogether as fluid flows through small valve seat 120 faster than it can enter passage 212. This pressure differential begins to lift membrane 110. When main valve seat 124 and main valve seat opening 406 are opened, pressure through inlet 101, fluid passage 212, on both sides of membrane 110, and in main valve seat 124 are equal, while outlet 103 is subject to ambient pressure.

As used herein the singular forms "a," "an," and "the" include plural referents. The term "combination" is inclusive of blends, mixtures, alloys, reaction products, and the like. Unless defined otherwise, technical and scientific terms used herein have the same meaning as is commonly understood by one of skill. Compounds are described using standard nomenclature. The term "and a combination thereof" is inclusive of a combination of one or more of the named components, optionally with one or more other components not specifically named that have essentially the same function.

While the subject matter has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present disclosure should be assessed as that of the appended claims and any equivalents thereto.

The invention claimed is:
1. A water valve comprising:
a chamber defining an inlet and an outlet;
an anchor disposed in the chamber;
a pull element engaged with the anchor;
a sealing cylinder engaging the pull element;
a membrane with a proximal surface facing toward the inlet and a distal surface facing away from the inlet, wherein the membrane defines a central cavity, that engages the sealing cylinder, and a continuous substantially radial surface surrounding and extending from the central cavity, wherein the central cavity is the only opening defined in the membrane;
a fluid passage structure with an interior and an exterior, wherein the fluid passage structure originates approximate the inlet and extends through the central cavity defined in the membrane;
in an anchor first position the pull element closes a small valve seat defined in the sealing cylinder and water flows through a bypass channel to engage the distal surface of the membrane;
in an anchor second position, displacement of the anchor moves the pull element to open the small valve seat and water flows through the small valve seat through an interior of the sealing cylinder and out via the outlet; and
in an anchor third position, the sealing cylinder is displaced by the pull element and opens a main valve seat such that water flows substantially from the inlet through the outlet.

2. The water valve of claim 1, wherein in the anchor third position, water flows substantially from the inlet through the outlet while flow reduces through the small valve seat.

3. The water valve of claim 1, wherein in the anchor third position, water flows substantially from the inlet through the outlet without passing through a filter.

4. The water valve of claim 1, wherein the sealing cylinder is at least partially encircled by a filter.

5. The water valve of claim 4, wherein only water passing through the filter at least partially encircling the sealing cylinder contacts the distal surface of the membrane.

6. The water valve of claim 4, wherein only water passing through the filter at least partially encircling the sealing cylinder flows through the small valve seat and out the outlet.

7. The water valve of claim 1, wherein the membrane is flexible.

8. The water valve of claim 1, wherein a diameter of the bypass is smaller than a diameter of the small valve seat.

9. A method of regulating fluid flow comprising:
   forming a housing with an inlet and an outlet for a fluid stream;
   placing a membrane in the housing with a proximal face directed toward the inlet and a distal face directed away from the inlet, wherein only a single opening is defined in the membrane;
   forming a fluid passage structure with an interior and an exterior, wherein the fluid passage structure originates approximate the inlet and extends through the single opening defined in the membrane;
   forming a control flow pathway in the housing that exerts pressure on the distal surface of the membrane while preventing fluid from exiting via the outlet;
   positioning a movable member in the housing that influences the control pathway, wherein repositioning the movable member opens a first valve seat that allows the fluid stream to exit the control flow pathway; and
   further positioning the movable member to open a second valve seat, wherein opening the second valve seat allows fluid to flow from the inlet to the outlet and bypass the control pathway.

10. The method of claim 9, when the second valve seat is open, fluid flows from the inlet through the outlet without passing through a filter.

11. The method of claim 9, further including positioning a sealing cylinder in the housing that is at least partially surrounded by a filter.

12. The method of claim 11, wherein only water passing through the filter at least partially surrounding the sealing cylinder contacts the distal surface of the membrane.

13. The method of claim 11, wherein only water passing through the filter at least partially encircling the sealing cylinder flows through the first valve seat valve seat and out the outlet.

14. The method of claim 9, wherein the membrane is flexible.

15. The method of claim 9, wherein a diameter of the control pathway at an entrance of the control pathway is smaller than a diameter of the first valve seat.

* * * * *